(12) United States Patent
Gibbs

(10) Patent No.: US 6,764,358 B2
(45) Date of Patent: Jul. 20, 2004

(54) AMPHIBIOUS VEHICLE

(75) Inventor: Alan Timothy Gibbs, London (GB)

(73) Assignee: Gibbs Technologies Ltd. (GB)

( * ) Notice: Subject to any disclaimer, the term of this patent is extended or adjusted under 35 U.S.C. 154(b) by 41 days.

(21) Appl. No.: 10/381,570

(22) PCT Filed: Aug. 23, 2001

(86) PCT No.: PCT/GB01/03771

§ 371 (c)(1), (2), (4) Date: Mar. 25, 2003

(87) PCT Pub. No.: WO02/18161

PCT Pub. Date: Mar. 7, 2002

(65) Prior Publication Data

US 2004/0014371 A1 Jan. 22, 2004

(51) Int. Cl.[7] .............................................. B63B 35/00
(52) U.S. Cl. ................. 440/12.5; 440/12.54; 440/12.51
(58) Field of Search ............................... 440/12.5–12.54

(56) References Cited

U.S. PATENT DOCUMENTS

| 2,350,037 A | 5/1944 | Hofheins et al. |
| 2,618,979 A | 11/1952 | Benning |
| 3,026,841 A | * 3/1962 | Pender .................... 440/12.53 |
| 5,531,179 A | 7/1996 | Roycroft et al. |

OTHER PUBLICATIONS

International Preliminary Examination Report dated Jun. 24, 2002.
International Search Report dated Jul. 12, 2001.

* cited by examiner

Primary Examiner—Ed Swinehart
(74) Attorney, Agent, or Firm—Watts Hoffmann Co., L.P.A.

(57) ABSTRACT

Amphibious vehicle (40, FIG. 7) comprises engine (2) with its crankshaft aligned with front and rear axis (X) of the vehicle; transmission (3); and differential (4) offset from the transmission. The differential has front and rear outputs (21, 16), whose axes are parallel to axis (X). These outputs drive at least one retractable front road wheel (42, FIG. 7) ahead of the front passenger seats, and corresponding retractable rear road wheel(s) (48, FIG. 7) behind the rear passenger seats. The marine drive power take off (PTO) may be taken from the engine timing end (7), as a sandwich PTO between engine and transmissions (28, FIG. 5), or from the transmission (38, FIG. 6). Front and rear differentials (22 and 17) may be provided. Decouplers may be provided in front and rear road wheel outputs, and in the marine drive (10). The engine may be mounted to the rear of the passenger seat(s).

9 Claims, 6 Drawing Sheets

AMPHIBIOUS VEHICLE

CROSS REFERENCE TO RELATED APPLICATIONS

The present application claims priority from International application No. PCT/GB01/03771 with an international filing date of Aug. 23, 2001 which, in turn, claims priority from GB Patent Application No. 0021007.0, filed Aug. 26, 2000.

The present invention relates to an amphibious vehicle having retractable road wheels.

Except for such a vehicle designed only to use prepared firm ramps to leave the water, it is a practical necessity to provide front and rear wheel drives. Such a vehicle is shown in U.S. Pat. No. 5,531,179 Roycroft. U.S. Pat. No. 5,410,980 and U.S. Pat. No. Des. 356,056 both to Wardavoir show the Hobbycar vehicle which also has four wheel drive. A problem with four wheel drive transmission arrangements in amphibious vehicles is that space is usually restricted. For instance Wardavoir has chosen to locate the vehicle's engine (see U.S. Pat. No. 5,410,98) in the centre of the vehicle causing the seating to be spaced in small pockets around the engine over the front and rear axles. The resulting marine performance was poor because the vehicle tended to dig its nose into the water when under way and flood the passengers. Furthermore, Wardavoir's vehicle was uncomfortable due to seating being above the front and rear axles.

The Roycroft vehicle shown in U.S. Pat. No. 5,531,179 above had improved marine performance because the centre of gravity was moved rearwards by mounting the engine to the rear of the rear axle thus enabling a nose up attitude in the water. However the land performance was adversely affected and this was particularly so when leaving water onto soft ground, e.g. beaches. Part of the problem with the Roycroft conformation was the provision of the rear wheel differential within the transmission casing so that the transmission casing became elongated again tending to locate the engine too far to the rear.

In order to overcome the problem of poor weight distribution, so as to obtain good marine and land performance with improved ability to leave water onto soft ground, whilst retaining adequate traction, it is proposed according to the invention to provide an amphibious vehicle with an engine driving at least one rear and one front wheel—three, four, six or more road wheels may be used in total—the engine being mounted so that its crankshaft is parallel to the front and rear axis of the vehicle and wherein the drive from the engine to the wheels is through a differential offset from the crankshaft axis to one side of the transmission. The engine can be forward or rear facing, with a power take off for a marine propulsion unit from the engine or transmission. Where the engine is rear facing, that is where the timing end is at the rear, the power take off for the marine propulsion unit is in this latter case preferably from the timing end. The road wheels should be retractable so that they are faired for improved marine performance.

Embodiments of the invention will now be described by way of example and with reference to accompanying drawings in which:

FIG. 1 is the Hobbycar vehicle invented by Wardavoir and as shown in U.S. Pat. No. 5,410,980 and U.S. Pat. No. Des. 356,056 indicating the waterline found in trials with a driver only;

Figure 1:
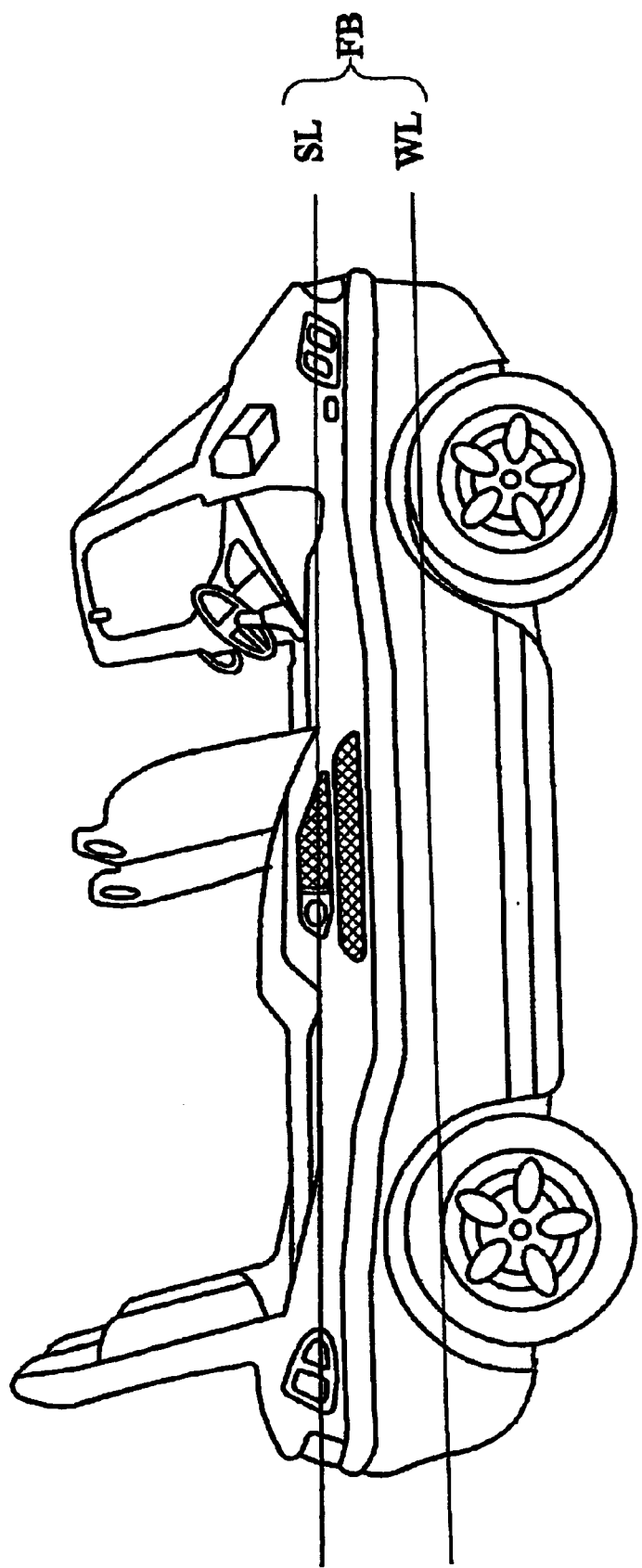

The Hobbycar amphibian shown in FIG. 1 has been subjected to a series of trials by the present inventor and further tests are reported in Top Gear magazine, July 1995. The findings were that the performance in water was sluggish, even at its maximum speed of about 5 knots. Also the freeboard was very low so that a mild swell caused splashing over the sides of the vehicle into the footwells. This is shown in FIG. 1 where WL represents the waterline; SL represents the "splash line" where water enters the vehicle; and FB represents the freeboard, or safety margin. The seating was awkward owing to the conformation and arrangement of the transmission cramping the footwells of the unsociably separated seats of the vehicle. As mentioned above, location of seating above the axles was uncomfortable; and this arrangement was unsuitable for providing wheel retraction. Wheel retraction however may not have been necessary for the cargo carrying facility envisaged where speed was not critical.

Figure 6:
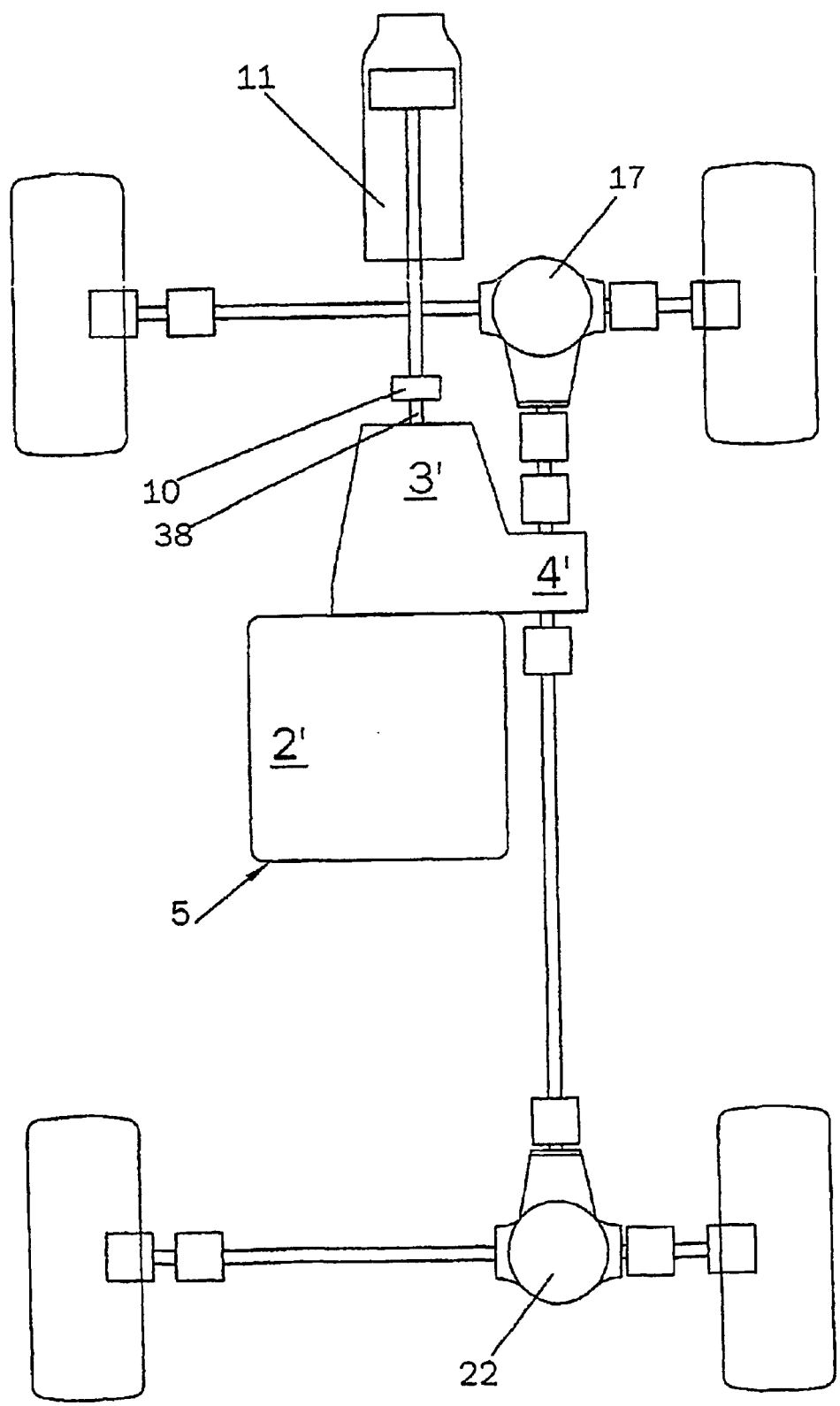
FIG. 6 shows a further alternative power train for the vehicle of FIG. 7 according to a third embodiment of the invention seen from above.
Figure 7:
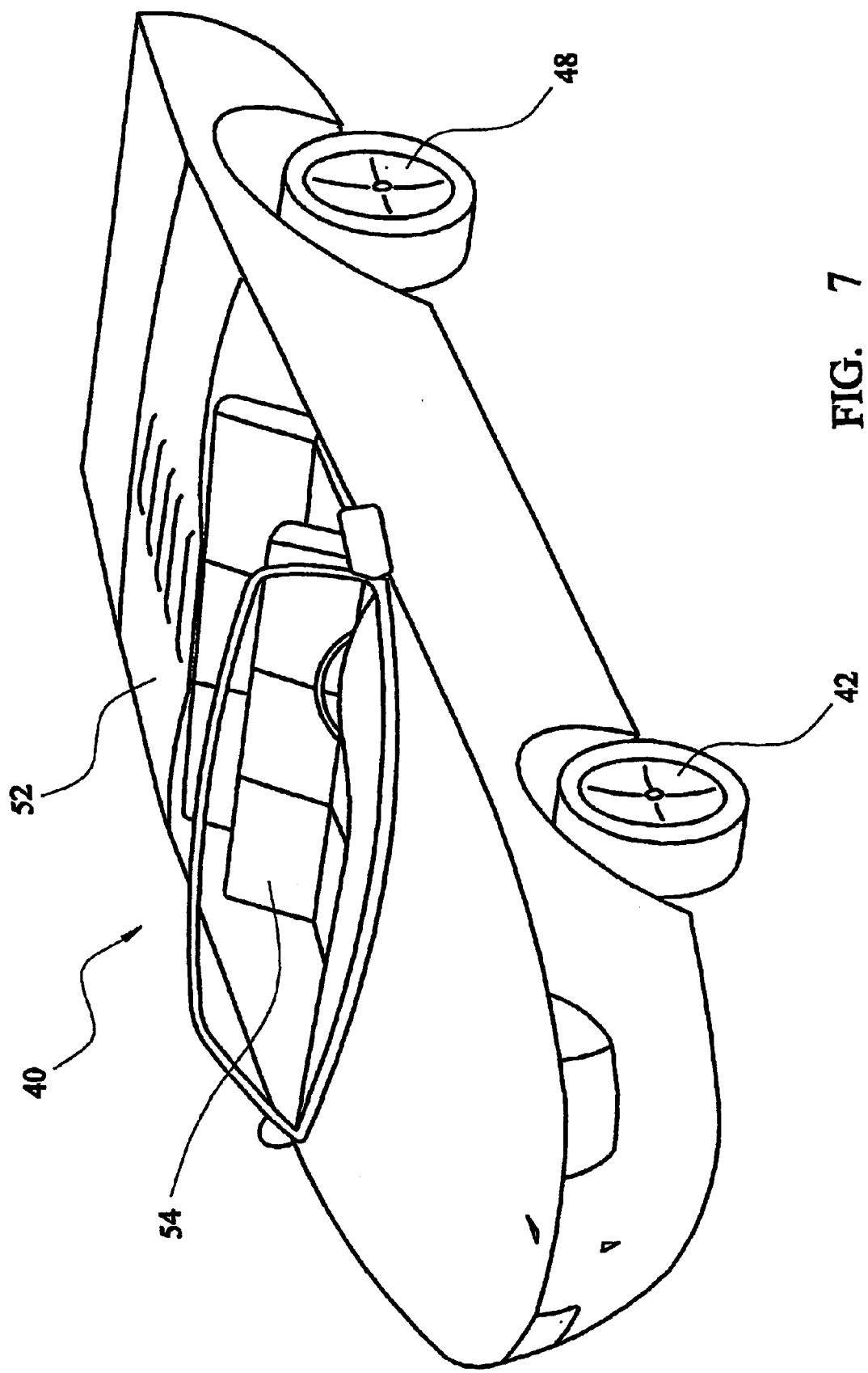
FIG. 7 is a perspective view of an amphibious vehicle according to the invention.

The hull or rather body 40 design of FIG. 7 is designed, however, for fast marine and good land performance and has retractable wheels 42,48 which retract in manner similar to that shown in Roycroft's patent U.S. Pat. No. 5,531,179 referenced above. Six seats 54 are provided and the engine is mounted in each embodiment described with reference to FIGS. 2 to 6 below the air intake panel 52. The engine exhaust and cooling systems may be arranged in a compartment separate to the engine compartment.

Figure 2:
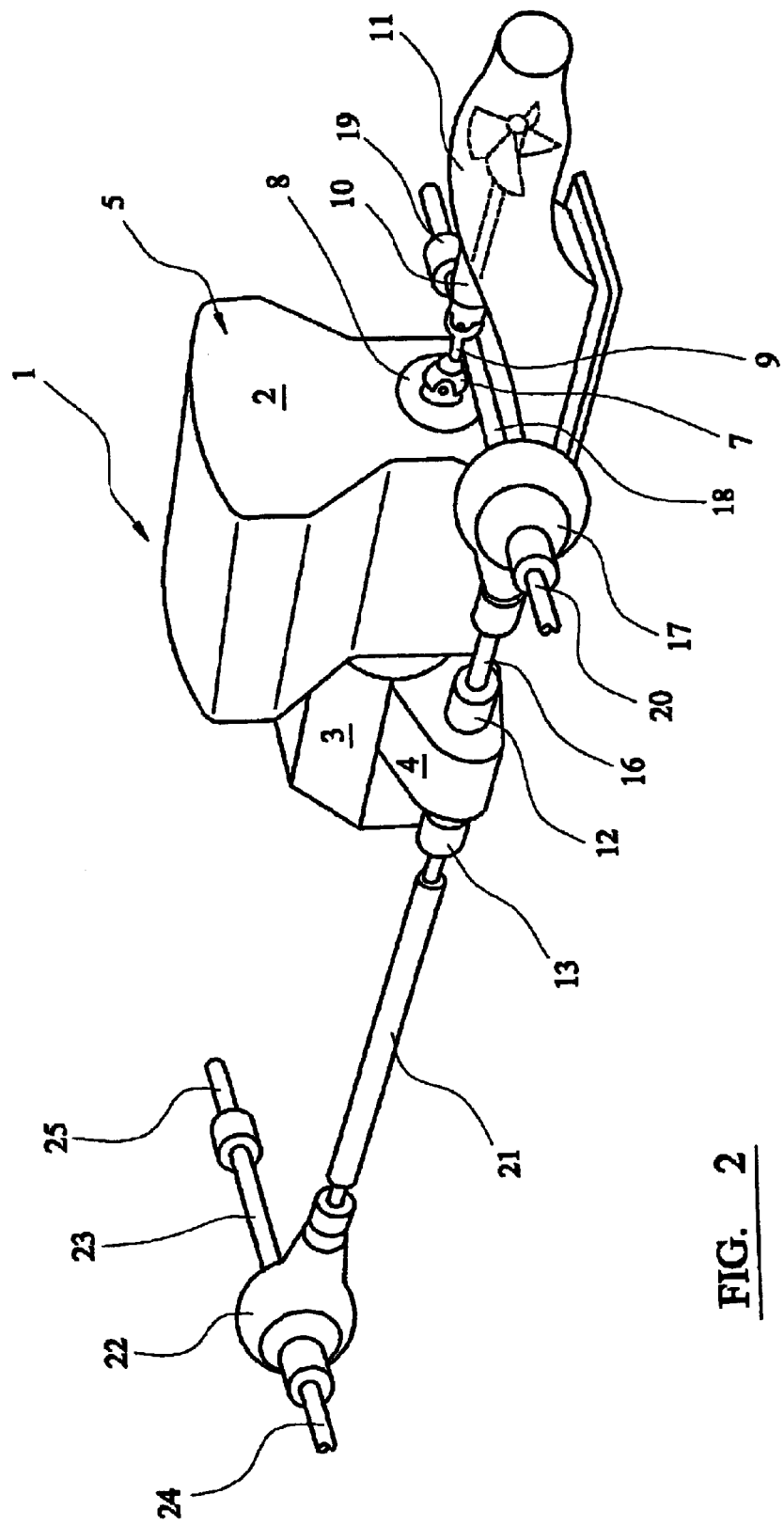
FIG. 2 shows in perspective one power train for the vehicle of FIG. 7 according to a first embodiment of the invention.
Figure 3:
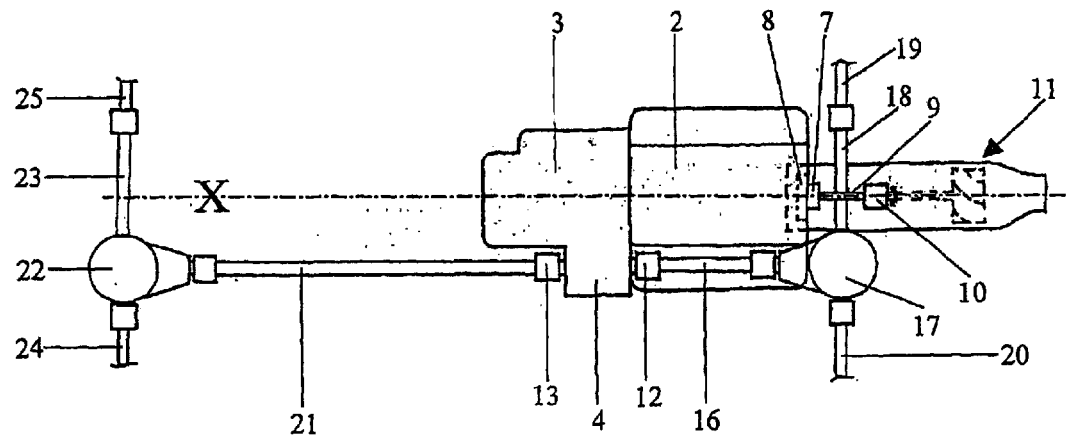
FIG. 3 shows the power train of FIG. 2.
Figure 4:
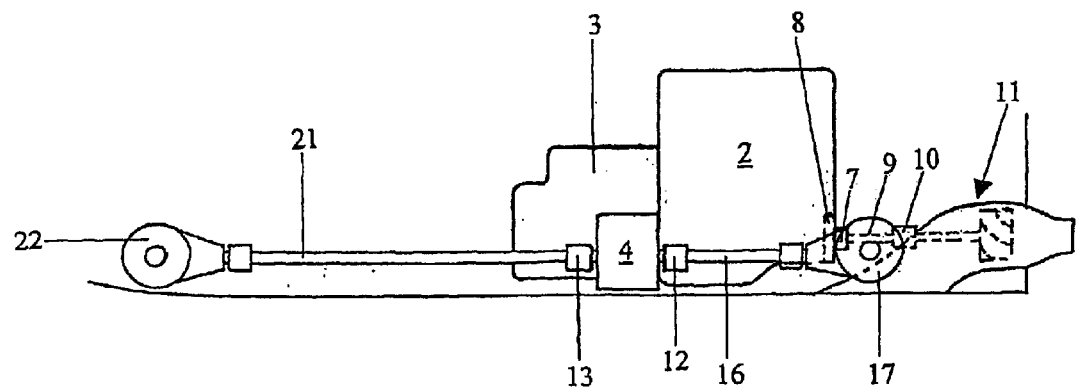
FIG. 4 shows the power train of FIG. 3 from one side.

In FIGS. 2 to 4, a power train 1 is shown with engine 2 arranged for mounting in body 40 so that it is longitudinally in alignment with the vehicle's front and rear axis X (FIG. 3). The timing end 5 of the engine 2 faces the rear of the vehicle and the transmission 3 is in front of the engine. A differential 4 is located so as to be offset to one side of the transmission 3. Differential 4 may be a limited slip device, such as a Torsen differential or a viscous coupling. Such a differential will redistribute power if one or more wheels on one axle start to spin. Constant velocity joints 12,13 are provided to connect forward and rear outputs from the offset differential the axes of which outputs are substantially parallel to the front and rear axis X.

A rear propeller shaft 16 is connected to joint 12 and a front propeller shaft 21 is connected to joint 13. Shaft 16 is connected to a further differential 17 from which extends axle shaft 20 for left side rear wheel (48, FIG. 7) and a relay shaft 18 connected to axle shaft 19 for right side rear wheel (48, FIG. 7).

The front propeller shaft 21 drives front differential 22 from which extends front axle shaft 24 for left side front wheel (42, FIG. 7) and relay shaft 23 connected to front axle shaft 25 for right side front wheel (42, FIG. 7).

At the timing end 5 of the engine 2, a conventional crankshaft pulley or sprocket 8 is adapted to receive a drive coupling 7. If no pulley or sprocket is provided, coupling 7 may be connected directly to the end of the crankshaft. A drive shaft 9 provides drive from coupling 7 to an optional decoupler 10 which is connected to a water jet marine propulsion unit 11. Shaft 9 is shown above shaft 18 but may be below if necessary.

Figure 5:
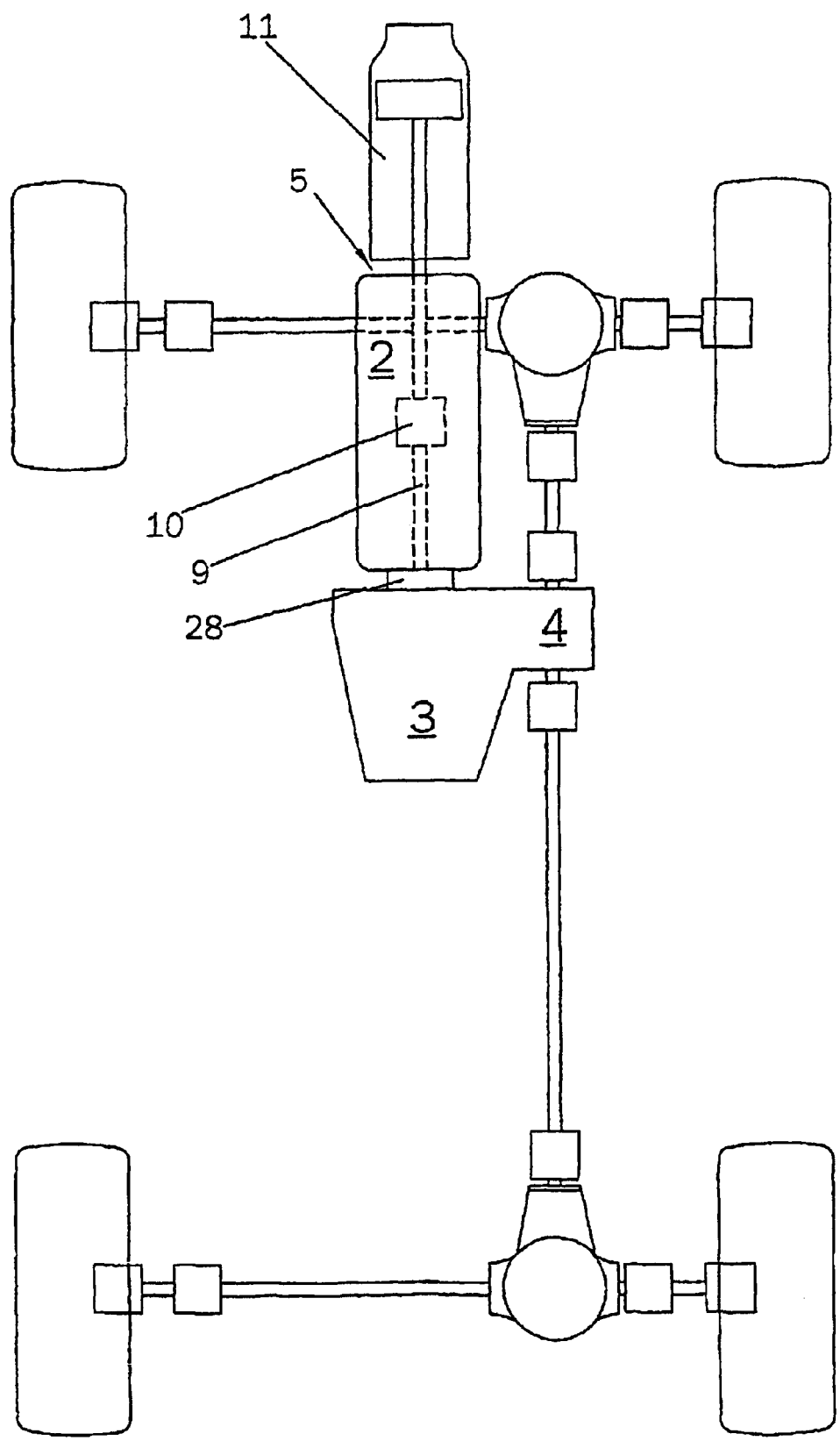
FIG. 5 shows an alternative power train for the vehicle of FIG. 7 according to a second embodiment of the invention seen from above.

In the second embodiment shown in FIG. 5 the essential engine alignment is retained and is again rear facing so that the marine propulsion unit 11 is located adjacent the timing end. At the transmission end a sandwich power take off 28 is provided, which drives shaft 9 through optional decoupler 10 to marine drive 11. Such power take offs are known in the art, and usually comprise a geared arrangement; but a chain or belt drive may be used here according to FIGS. 1 and 2 or 3 and 4 of our co-pending application GB0020884.3.

In the third embodiment shown in FIG. 6 the essential engine 2' alignment is again retained but is forward facing with a power take off 38 from the transmission 3, for example according to our co-pending European application no. 01306287.2. If the power take off 38 is not driven when the transmission is in neutral, it will be necessary to keep the transmission in gear to drive the marine drive. In this case, it will be necessary to provide decouplers (not shown) between differential 4' and differentials 17 and 22 to decouple drive to the road wheels when the amphibian is driven on water.

In all embodiments of the invention, transmission 3 may comprise a manual, sequential change manual, automated manual, automatic or continuously variable transmission (CVT).

Whilst a four wheeled vehicle is shown in FIG. 7, it is possible within the scope of the invention to have a three, six or more road wheels.

Although the most comfortable and sociable seating area in a vehicle according to the invention would be between front and rear axles as shown in FIG. 7, should additional seating be required outside this area for special purpose vehicles, it could be provided behind the rear axle and behind the engine position.

What is claimed is:

1. An amphibious vehicle comprising:

an elongated body defining a front and rear axis;

an engine mounted to said body, said engine having a crankshaft aligned with said front and rear axis;

said crankshaft having a timing end and a main transmission end opposite the timing end, the crankshaft arranged to drive a transmission from said main transmission end;

said transmission arranged to drive a differential offset from the transmission, the differential having front and rear outputs, wherein an axis of said front output and an axis of said rear output are substantially parallel to said front and rear axis;

at least one passenger seat mounted to said body; and at least three retractable road wheels;

said front output arranged to drive at least one retractable road wheel disposed in front of said at least one passenger seat;

said rear output arranged to drive at least one retractable rear road wheel disposed behind said at least one passenger seat.

2. The amphibious vehicle according to claim 1 wherein the differential is a limited slip differential.

3. The amphibious vehicle according to claim 1 wherein the transmission is forward of the engine, and a marine drive is taken from the timing end of the engine, where the timing end of the engine faces to the rear of the vehicle.

4. The amphibious vehicle according to claim 1 wherein a marine propulsion unit is driven via a marine drive from the transmission end of the engine, through a sandwich power take off.

5. The amphibious vehicle according to claim 1 wherein a marine propulsion unit is driven via a marine drive from a power take off from the transmission.

6. The amphibious vehicle according to claim 1 wherein the offset differential is arranged to drive via the front and rear outputs each respectively a further differential and thence front and rear wheels.

7. The amphibious vehicle according to claim 1 wherein a decoupler is provided in each of the front and rear outputs.

8. The amphibious vehicle according to claim 3 wherein the marine drive includes a decoupler.

9. The amphibious vehicle according to claim 1 wherein the engine is mounted behind said at least one passenger seat.

* * * * *